US006939044B1

(12) United States Patent  (10) Patent No.: US 6,939,044 B1
Lyon et al.  (45) Date of Patent: Sep. 6, 2005

(54) RECIRCULATING ROLLING ELEMENT CARTRIDGE FOR LINEAR MOTION BEARING ASSEMBLY

(75) Inventors: Gregory S. Lyon, Mamaroneck, NY (US); Alison Ng, New York, NY (US); Eric Kim, Flushing, NY (US)

(73) Assignee: Thomson Industries, Inc., Port Washington, NY (US)

( * ) Notice: Subject to any disclaimer, the term of this patent is extended or adjusted under 35 U.S.C. 154(b) by 107 days.

(21) Appl. No.: 10/110,861

(22) PCT Filed: Oct. 23, 2000

(86) PCT No.: PCT/US00/29341

§ 371 (c)(1),
(2), (4) Date: Aug. 29, 2002

(87) PCT Pub. No.: WO01/31212

PCT Pub. Date: May 3, 2001

Related U.S. Application Data

(60) Provisional application No. 60/160,966, filed on Oct. 22, 1999.

(51) Int. Cl.⁷ .......................... F16C 29/06; F16H 1/04
(52) U.S. Cl. ..................... 384/45; 74/388 PS; 74/422
(58) Field of Search .................. 384/43, 45; 74/422, 74/409, 388 PS

(56) References Cited

U.S. PATENT DOCUMENTS

| 4,040,679 | A | * | 8/1977 | Teramachi | 384/45 |
| 4,271,716 | A | * | 6/1981 | Carduner | 74/422 |
| 4,527,840 | A | * | 7/1985 | Mugglestone et al. | 384/45 |
| 4,531,603 | A | * | 7/1985 | VanCise, Jr. | 180/428 |
| 4,553,447 | A | * | 11/1985 | Betz | 74/422 |
| 5,273,367 | A | * | 12/1993 | Tanaka | 384/45 |
| 6,203,199 | B1 | * | 3/2001 | Pfeuffer | 384/45 |

* cited by examiner

*Primary Examiner*—Thomas R. Hannon
(74) *Attorney, Agent, or Firm*—Dilworth & Barrese, LLP

(57) ABSTRACT

A bearing assembly includes at least one and preferably two ball tracks each having a load-bearing portion, a return portion, and a turn-around portion, and a plurality of bearing balls, wherein the ball track is configured for the guided recirculation of the bearing balls. The bearing assembly includes a housing block with a channel at its distal end for receiving a movable shaft. The channel includes an elongated window aligned with each of the load-bearing portions of the tracks, the window allowing portions of the bearing balls to protrude therethrough to support the shaft. The bearing tracks define planes which can be oriented parallel to or perpendicular to the longitudinal axis of the housing block, or which together form an angled V-shaped configuration.

19 Claims, 9 Drawing Sheets

RECIRCULATING ROLLING ELEMENT CARTRIDGE FOR LINEAR MOTION BEARING ASSEMBLY

This application claims benefir of provisional application No. 60/160,966, filed Oct. 22, 1999

BACKGROUND

1. Field of the Invention

This invention relates to bearing assemblies, and more particularly to ball track bearing assemblies that reduce friction associated with movement of two bodies relative to each other.

2. Description of the Related Art

Bearing assemblies may be of the type which support a carriage or block for movement along a support member such as an elongated shaft, rail or spline to reduce friction associated with longitudinal or rotational motion. These bearing assemblies can be of the open or closed type.

Bearing assemblies also contemplated by the present invention generally include an outer housing and a block dimensioned for insertion into the outer housing. The block defines a plurality of longitudinal planar faces each having at least one ball track in a loop configuration for containing and recirculating bearing balls. The ball tracks include open portions which facilitate load transfer from the supporting shaft to load bearing structure such as ball retainers operatively associated with either the block or the outer housing. Return portions of the ball tracks permit continuous recirulation of the bearing balls through the ball tracks during linear motion. The block is typically formed as a monolithic element with the ball tracks integrally incorporated therein. See, U.S. Pat. No. 3,767,276 to Henn. This structure, however, is difficult to efficiently manufacture because of the complex molds required. In particular, the ball tracks are incorporated into the molds and the ball tracks may require further machining operations for precise alignment and tolerances of the ball tracks for proper recirulation of the bearing balls.

Linear motion recirculating bearing assemblies having multiple tracks for longitudinal movement along a shaft are known in the art. See, for example, U.S. Pat. Nos. 4,181,375, 4,293,166, 4,463,992 and U.S. Pat. No. 3,545,826 entitled Compliant and Self-Aligning Ball Bearing for Linear Motion. These bearing assemblies are typically characterized by a housing which forms a plurality of tracks arranged in radial planes with respect to the longitudinal axis of the shaft. Each of the tracks has a load-bearing path wherein the roller elements contact the shaft and a radially spaced return path for serially recirculating the roller elements back to the load-bearing path. Turnarounds are positioned at each axial end of the tracks to interconnect the load-bearing and return paths. These bearing assemblies, particularly the assembly shown in the '992 patent, are even more difficult to manufacture because a plurality of ball tracks are being formed.

A plurality of individual axial guides are commonly provided in conjunction with the load bearing paths to guide and separate the rolling elements in the load bearing paths. These axial guides are usually in the form of separate axially extending elements which are individually placed between the end caps at the axial ends of the bearing assembly. Similarly, a plurality of individual inner guides may be positioned at each of the inner axes of the turnarounds to guide the roller elements from the load-bearing tracks to the return tracks. Both the axial guides are the inner guides usually must be individually and separately positioned within the bearing assembly. This technique is both time consuming and inefficient.

In addition to the problems associated with assembling and positioning the axial and inner guides, bearing assemblies making use of typical individual bearing plates tend to have alignment and positioning problems associated therewith. These bearing plates are usually positioned longitudinally over the load bearing tracks and serve to transmit loads from the carriage, through the roller elements, to the shaft. If these bearing plates are not properly and securely positioned, the bearing assembly will not operate efficiently and may cause binding and/or misalignment of the rolling elements.

These designs for such linear bearing assemblies have some inherent drawbacks. For example, in the bearing of U.S. Pat. No. 4,717,264, the raceway rail has a load bearing surface and a single return surface, both formed in a lower side of the raceway rail. This arrangement does not make efficient usage of the space surrounding the rail and inhibits the placement of an optimum number of load-bearing paths for a given surface area. Also, the ball turnaround structure creates a tight arc for reversal which limits the speed capacity and can result in stagnation of ball movement through the ball path.

These bearing assemblies may be used, for example, with rack and pinion steering devices in automobiles. The steering assembly is normally of the rack and pinion type, running transverse to the axis of the vehicle. The pinion is typically loaded against the rack, such that there is a force transmitted between the rack shaft and the bottom of the housing. In rack and pinion steering gears, a rack bar transverses along its axis when the pinion, which has teeth meshing with the teeth of the rack bar, is turned by the steering wheel and column assembly. Commonly, a support yoke biases the rack bar, toward the pinion to maintain the desired meshing of the rack teeth with the pinion teeth during rotation of the pinion. The support yoke also reacts against shock loads transmitted to the rack bar from bumps in the road via the vehicle wheels, suspension and steering system tie rods.

In the past, attempts have been made to reduce the friction that results in this reaction, usually through the application of low-friction materials utilized in a known fashion. Friction can be reduced by applying low friction surface coatings to the constituent parts. Minimization of friction is an important factor for achieving a good steering feel facilitating safe driving conditions. In particular, in the case of a power failure, reducing friction allows a driver to steer a vehicle without loss of control of the vehicle. Bearing assemblies utilizing bearing balls have a particularly advantageous application with steering devices because they provide a smooth travel of the parts relative to one another.

It is highly desirable to have a bearing assembly having at least one rolling element track configured to reduce friction associated with movement of two bodies relative to each other in a low cost application of rolling element technology.

Accordingly, it is one object of the present invention to provide a bearing assembly having at least one rolling element track that facilitates recirulation of bearing balls for reducing friction associated with the movement of two bodies relative to each other.

It is a further object of the present invention to provide a bearing assembly including rolling element tracks having an efficient arrangement of load bearing and return paths to optimize quantities of rolling elements in the tracks.

It is another object of the present invention to provide a bearing assembly which is easily and efficiently manufactured and assembled.

These and other high desirable objects are accomplished by the present invention in a bearing assembly having rolling element tracks that facilitate recirulation of bearing balls disposed herein for reducing friction associated with movement of two bodies relative to each other in a low cost application of rolling element technology.

Objects and advantages of the invention are set forth in part herein and in part will be obvious therefrom or may be learned by practice with the invention, which is realized and attained by means of instrumentalities and is combinations pointed out in the appended claims. The invention comprises the novel parts, construction, arrangements, combinations, steps and improvements herein shown and described.

SUMMARY OF THE INVENTION

In accordance with the present invention, a bearing assembly is disclosed that includes at least one rolling element track having a load-bearing portion, a return portion and a turnaround portion interconnecting the load-bearing and return portions. A plurality of rolling elements such as bearing balls are disposed in the tracks. The track is configured for guided recirculation of the rolling elements.

The bearing assembly may include a pair of rolling element tracks separated by a center rib.

BRIEF DESCRIPTION OF THE DRAWINGS

Various embodiments of the invention are described below with reference to the drawings wherein.

DETAILED DESCRIPTION OF PREFERRED EMBODIMENT(S)

The bearing assembly of the present invention can be used, for example, in automotive vehicles for rack and pinion type steering apparatus, or in any other application wherein a moving shaft is supported on bearings. As used herein, the terms "vertical" and "horizontal" are used relative to each other. While the bearing assembly is described below in conjunction with the use of bearing balls, it should be noted that any type of rolling element is contemplated within the scope of this invention.

Figure 1:
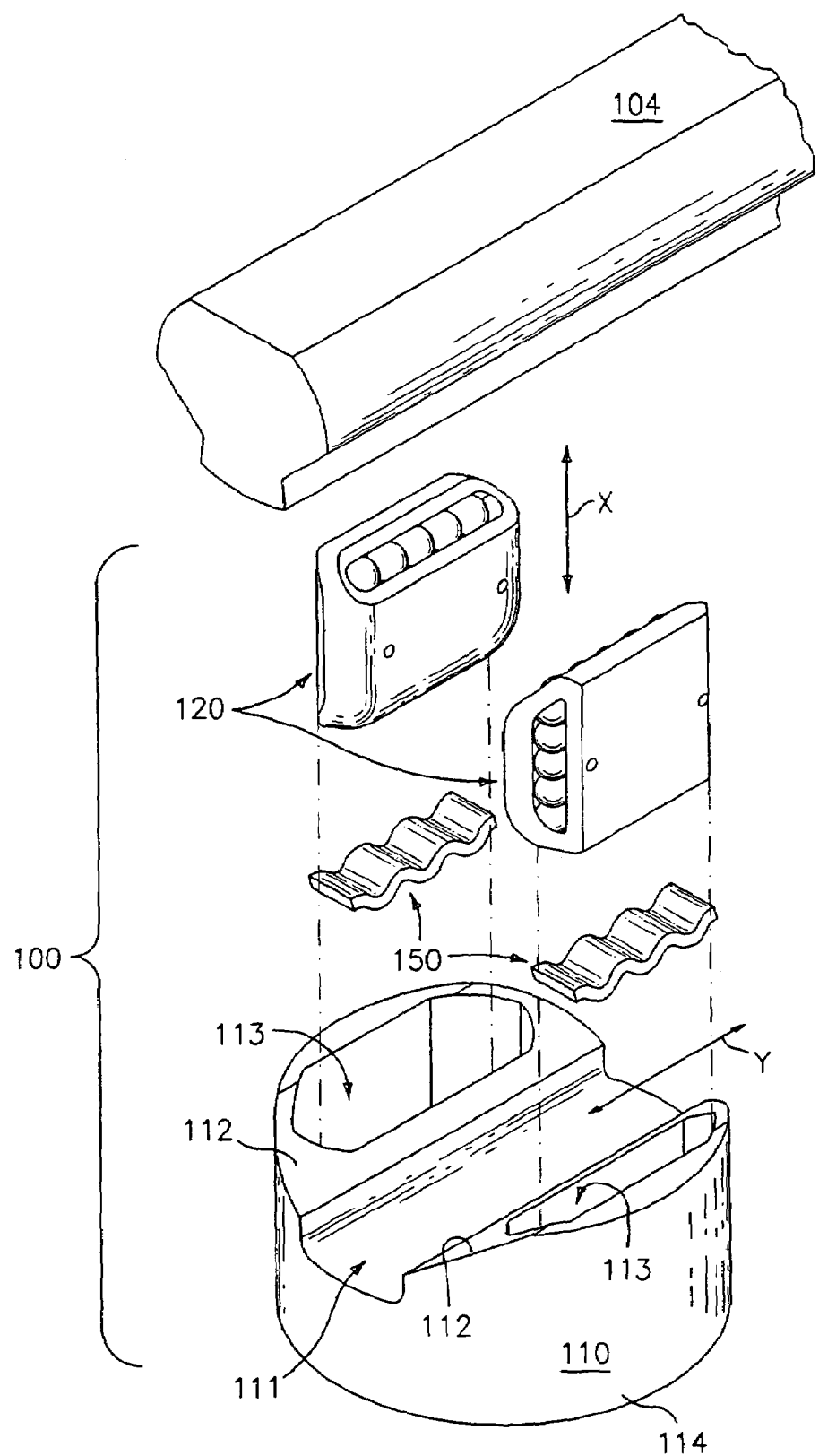
FIG. 1 is an exploded perspective view of an embodiment of a bearing assembly in combination with a shaft.
Figure 2:
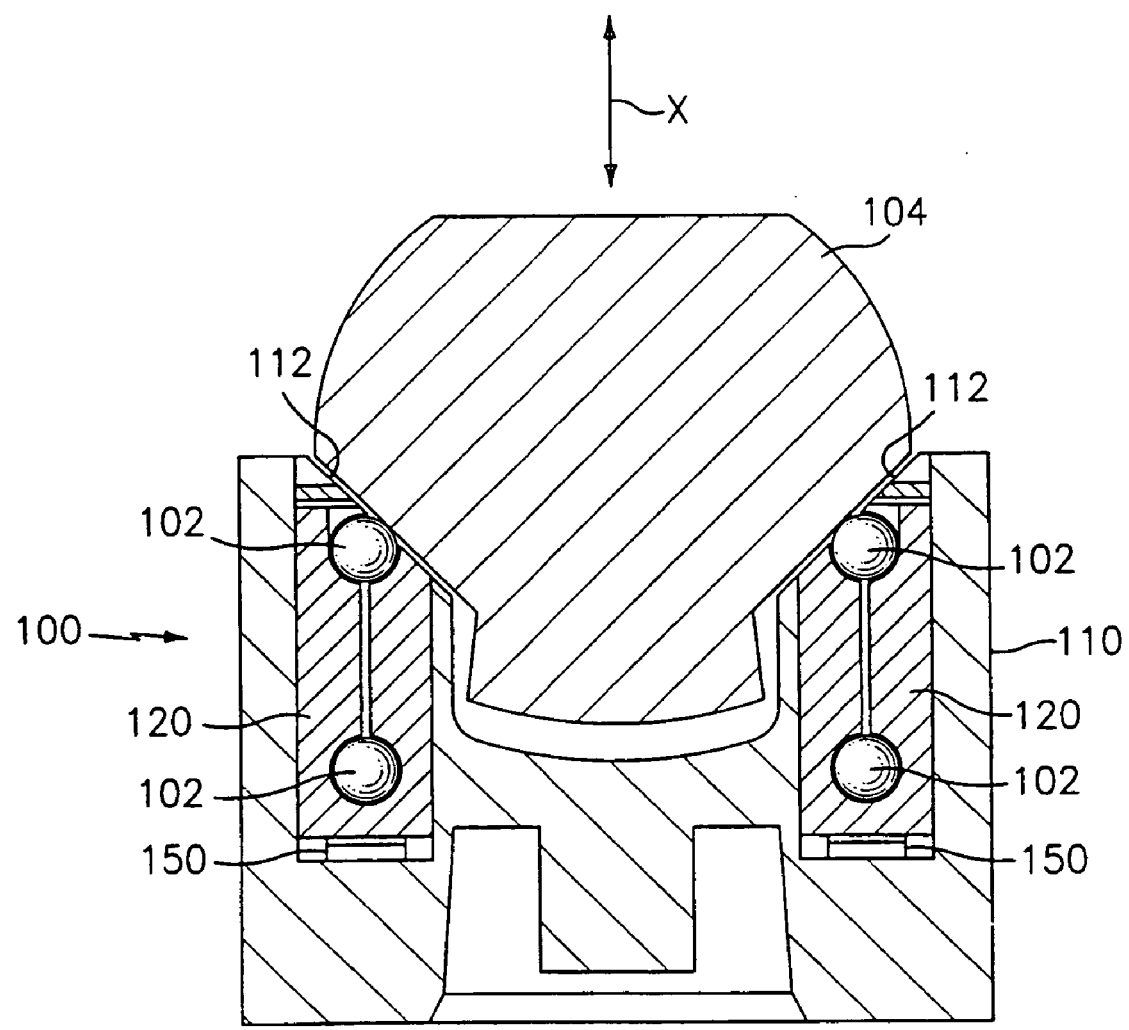
FIG. 2 is a sectional elevational view of the embodiment of FIG. 1.
Figure 3:
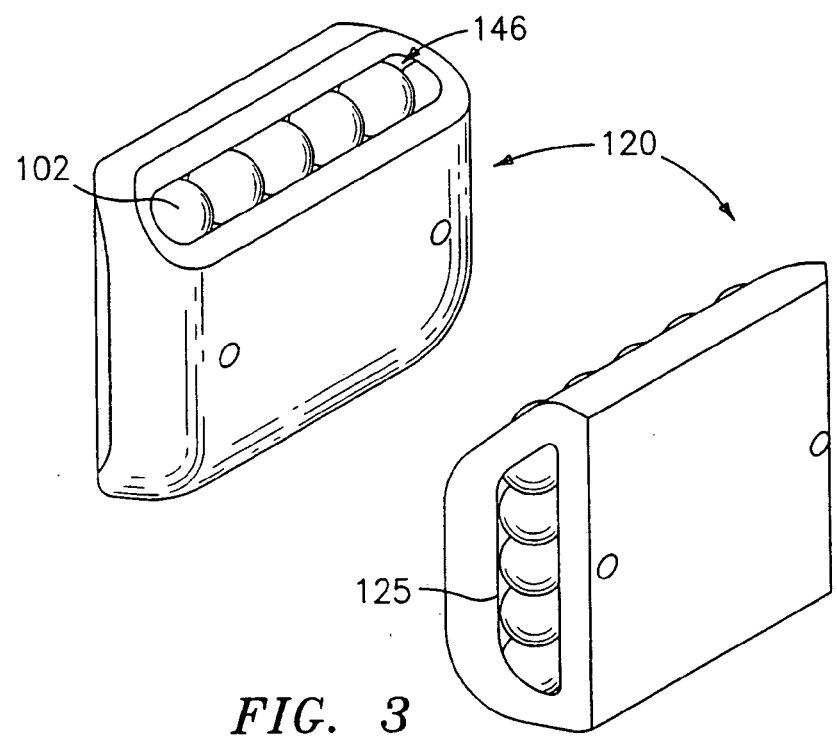
FIG. 3 is a perspective view of bearing cartridges.
Figure 4:
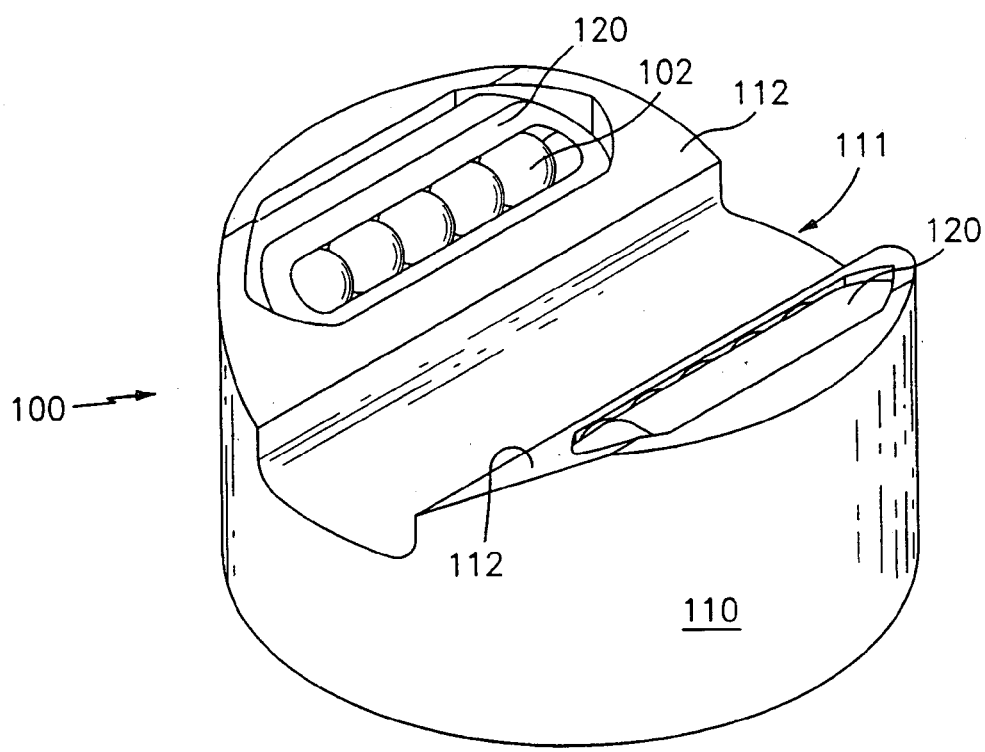
FIG. 4 is a perspective view of the bearing assembly of FIG. 1.
Figure 5:
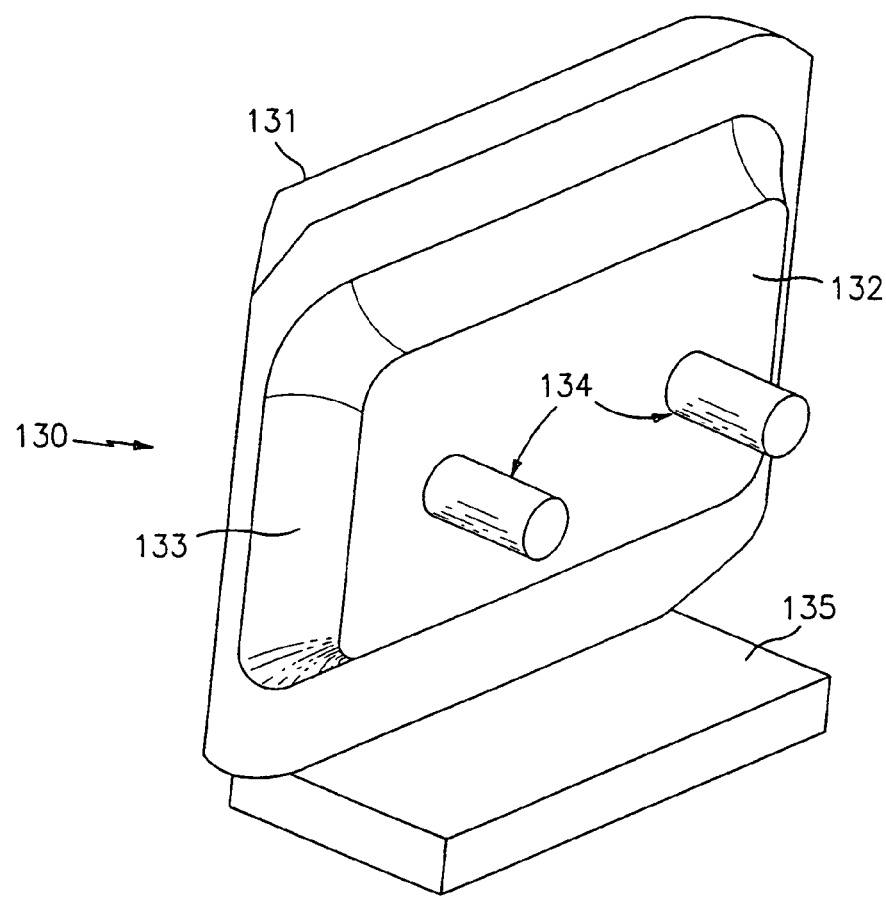
FIG. 5 is a perspective view of a bearing cartridge race.
Figure 6:
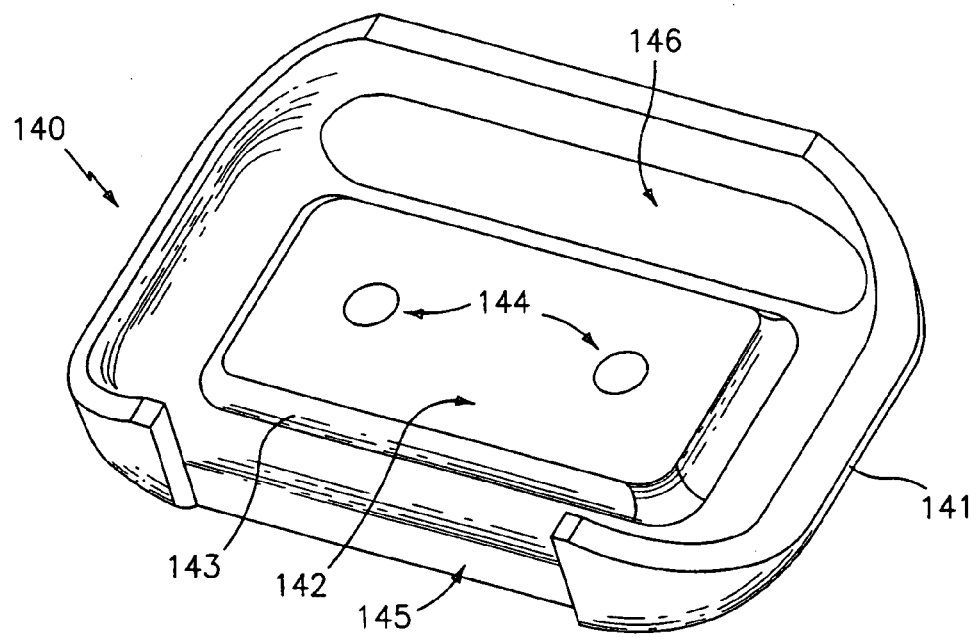
FIG. 6 is a perspective view of a bearing cartridge retainer.

Referring now to FIGS. 1 and 2, a bearing assembly 100 is shown for supporting linearly movable shaft or rail or rack 104. Bearing assembly 100 includes housing block 110, bearing cartridges 120 and optional corrugated leaf springs 150. Bearing assembly 100 employs guided recirculation of rolling load bearing elements (e.g., bearing balls) to reduce frictional forces created with regard to two bodies moving relative to one another. The bearing assembly provides a smooth travel of moving parts associated with rolling element technology at low cost due to its simplified construction and assembly.

Housing block 110 may be die cast from suitable metals or molded from suitable engineering plastics, for example, polyacetyls, polycarbonates, polyamides, etc. It is contemplated that engineering plastics used may incorporate metal stiffeners in order to provide sufficient rigidity for a particular bearing application. Block 110 can be formed by cold drawing processes and subsequently cut to a desired length, or extruded using known production techniques. Block 110 may be anodized, galvanized, etc., to provide corrosion resistance. One skilled in the art, however, will realize that other materials and fabrication methods suitable for assembly and manufacture, in accordance with the present invention, also would be appropriate.

Housing block 110 has a generally cylindrical body 114 defining a longitudinal axis X which is vertical as shown, but body 114 may have alternative geometric configurations such as rectangular, oval, etc. Housing block 110 may be mounted to desired machinery components by screws, adhesive, clips, or other suitable methods.

Housing block 110 includes a shaft interface portion defined by a channel 111 disposed between converging inclined walls 112. The shaft interface preferably has compatible wear characteristics with the shaft which can be achieved by selection of appropriate materials for constructing the housing block and/or shaft, or modifying the surface of the shaft interface by means of low friction or wear reducing coatings, attachment of wear strips, etc. Inclined walls 112 can generally define an angle between them of preferably from about 45° to about 160°, more preferably from about 60° to about 120°, and most preferably from about 80° to about 100°, although angles outside of these ranges may also be used if appropriate. Channel 111 defines a lateral direction Y which is orthogonal to the longitudinal axis X. Each inclined wall 112 defines a cartridge slot 113 which extends longitudinally into housing block 110. Cartridge slots 113 are respectively defined on opposite sides of channel 111 and each cartridge slot 113 has an elongated opening at the respective inclined wall 112 oriented laterally and parallel to the channel 111.

Optionally, a corrugated leaf spring 150 is disposed at the bottom of each cartridge slot 113. Leaf springs 150 can be fabricated from any strong, resilient material such as steel, plastics, etc. The leaf springs 150 are adapted to resiliently flatten at a predetermined level of load force. Preferably the level of load can range from 50 to 100 pounds force, more preferably from about 60 to 90 pounds force and most preferably from about 70 to 80 pounds force. Depending on the application, other ranges of force may be selected. The leaf spring 150 is resiliently biased to return to its original configuration when the force is relieved beyond the threshold level. Leaf springs 150 also function as shock absorbers.

Referring to FIGS. 3, 4, 5 and 6, bearing cartridges 120 house a plurality of bearing balls 102 for contacting the shaft 104. Each bearing cartridge includes a bearing cartridge race 130 (FIG. 5) and a bearing cartridge retainer 140 (FIG. 6) which are adapted to be joined to form the bearing cartridge 120.

The bearing cartridge race 130 can be fabricated from any suitable material such as steel, aluminum, bronze, engineering plastics such as polycarbonate, or other polymers or alloys with sufficient strength and toughness. A preferred material is copper infiltrated powder metal steel.

Bearing cartridge race 130 includes a back wall 131 having a rectangular projection 132. The rectangular projection 132 includes a peripheral curved wall 133 which, in conjunction with corresponding curved wall 143 (discussed below), forms a track portion in which bearing balls 102 are permitted to move. Posts 134 extend laterally from rectangular projection 132 and are adapted to engage corresponding holes 144 (discussed below). Base 135 extends from back wall 131 and forms the bottom of the bearing cartridge 120.

Bearing cartridge retainer 140 can be fabricated from the same or different material as that of bearing cartridge race 130. For moderate to high temperature applications preferred fabrication materials for bearing cartridge retainer 140 include liquid crystal polymer or sheet metal.

Bearing cartridge retainer 140 includes a plate 141 having a rectangular projection 142 of preferably the same length and width dimensions as rectangular projection 132 of the bearing cartridge race 130. Rectangular projection 142 includes a peripheral curved wall 143 which is adapted to match with curved wall 133. Curved walls 133 and 134 each constitute a portion of a track for guiding the movement of bearing balls. When the bearing cartridge race 130 and bearing cartridge retainer 140 are assembled the bearing balls 102 are confined to movement along the track formed by the adjacent curved walls 133 and 143.

Bearing cartridge retainer further defines holes 144 which are adapted to receive posts 134 of the bearing cartridge race when assembled. Slot 145 is adapted to receive base 135 of the bearing cartridge race.

Bearing cartridge retainer 140 also defines an elongated window 146 through which a portion of the ball bearings 102 extend. As can be seen from FIG. 3, for example, the width of elongated window 146 is less than the diameter of the ball bearings 102 so that the ball bearings are kept within the bearing cartridge 120 while a portion of the bearings is allowed to protrude beyond the window 146 in order to receive load from shaft 104. As can be seen from FIG. 3, when joined, bearing cartridge retainer 140 and bearing cartridge race 130 define windows 125 which allow the ball bearings 102 to engage the shaft.

Bearing cartridges 120 are each configured and dimensioned to slide into a respective one of the cartridge slots 113 with the bearing balls 102 exposed at inclined surfaces 112 and protruding sufficiently to maintain shaft 104 at a distance above and out of contact with the inclined surfaces 112. The bearing assembly 100 facilitates the low friction longitudinal sliding of shaft 104.

In the event of an overload condition, the bearing cartridges 120 are pressed down against the biasing force of springs 150, compressing the spring 150 such that the shaft 104 is brought into contact with the shaft interface portion (channel 111 and inclined surfaces 112) to augment the load bearing capacity of the bearing assembly by providing increased support to the shaft 104. With the increased frictional resistance accompanying contact with the shaft 104, the shaft interface portion of the bearing assembly may serve as a braking surface.

When shaft 104 is moved, bearing balls 102 rotate and also circulate within their respective tracks in a guided fashion.

Each track generally defines a plane which is longitudinally oriented, i.e., each plane has a dimension which is parallel to the longitudinal axis of the housing block. The planes defined by the bearing tracks are also parallel to each other.

Figure 7:
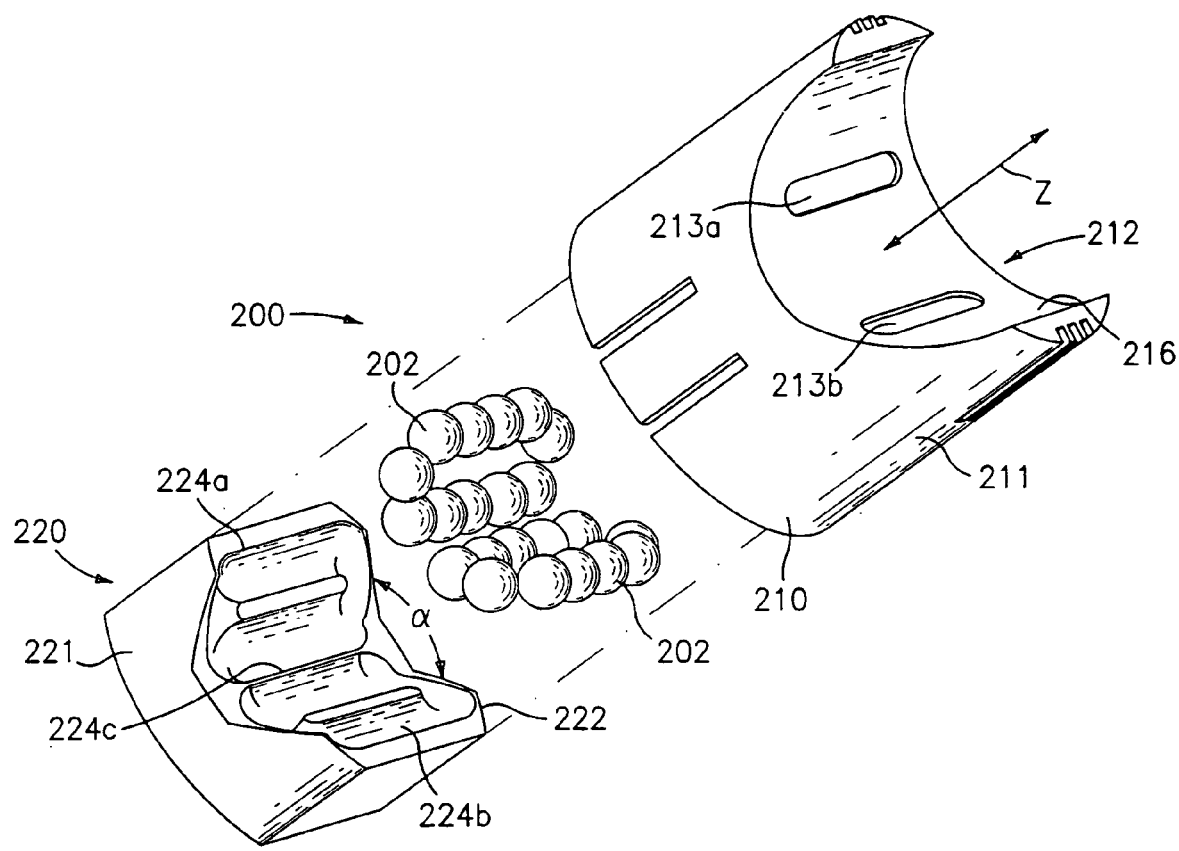
FIG. 7 is an exploded perspective view of an alternative embodiment of the bearing assembly.
Figure 8:
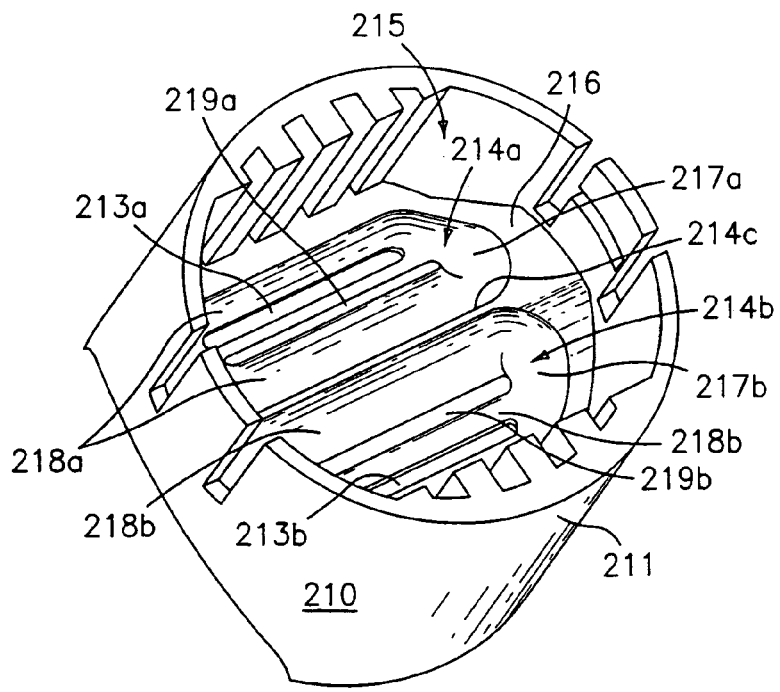
FIG. 8 is a perspective view of a bearing retainer.
Figure 9:
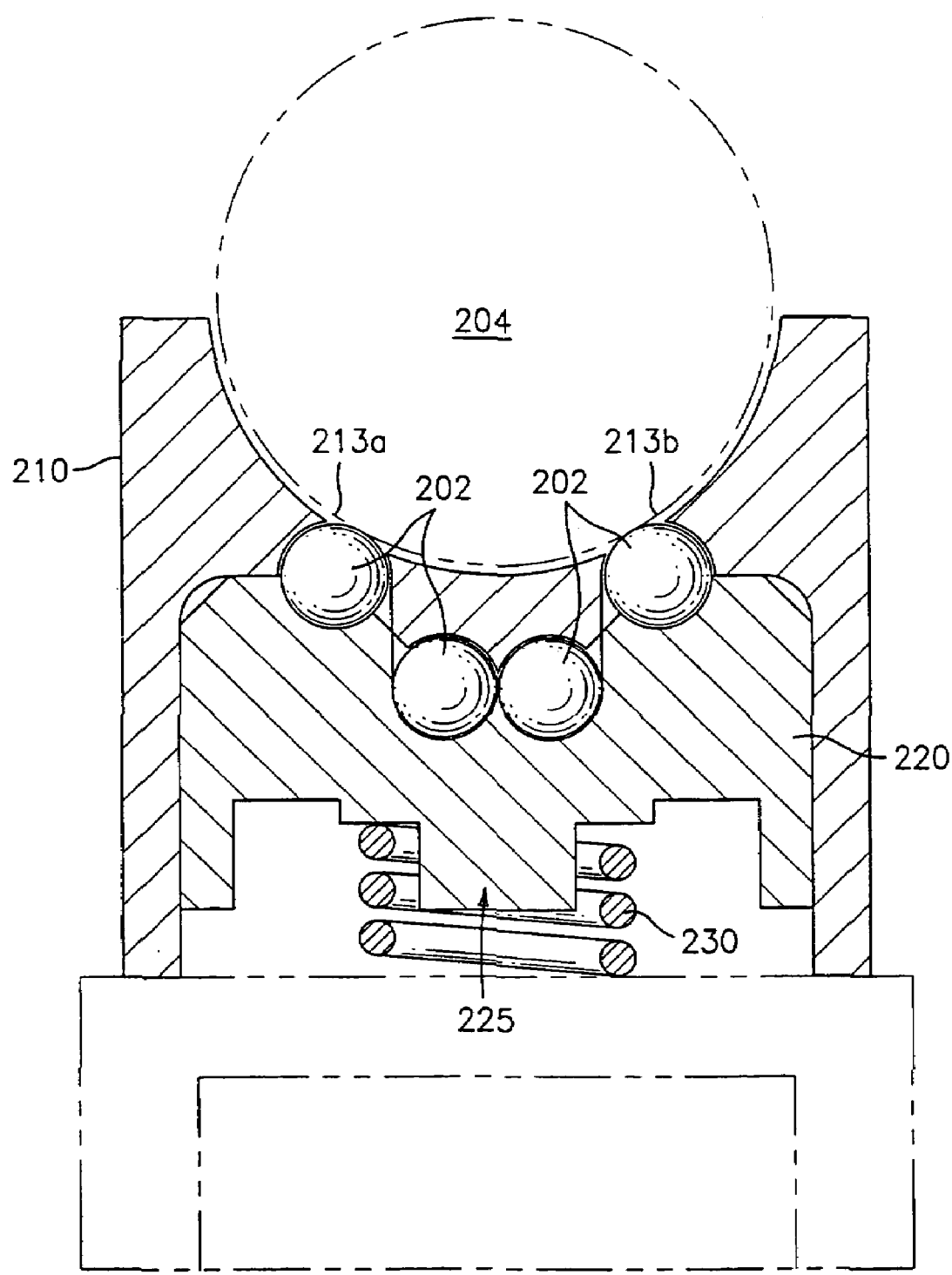
FIG. 9 is a sectional elevational view of the bearing assembly of FIG. 7.

Referring now to FIGS. 7, 8 and 9, an alternative embodiment of the bearing assembly is shown.

Bearing assembly 200 includes a housing block 210, bearing race 220, bearing balls 202, and a spring 230 (FIG. 9).

Housing block 210 also serves as a bearing retainer and includes a generally cylindrical body 211 defining a longitudinal axis Z. At its distal end, housing block 210 has a channel 212 for receiving a shaft 204 oriented transverse to the longitudinal axis Z. Shaft 204 is preferably cylindrical, although the bearing assembly channel 212 can be configured to accommodate shafts with non-circular cross-sections. The bearing assembly 200 is preferably adapted to accommodate linear and/or rotational movement of shaft 204.

Channel 212 is defined by the distal surface of distal wall 216 and includes two mutually parallel elongated windows 213a and 213b oriented parallel to the direction of the shaft 204 and channel 212. The width of each window 213a and 213b is less than the diameter of the bearing balls 202, thereby permitting a portion of a bearing ball to protrude through the window and into the channel for supporting the shaft 204. Thus, shaft 204 is not in contact with the distal surface of the distal wall 216, but is raised above and spaced apart from the distal surface, resting on the bearing balls 202 during overload conditions.

The proximal end of housing block 210 defines a proximal recess 215 adapted to receive bearing race 220 and which is at least partially defined by an interior V-shaped proximal surface of distal wall 216. The proximal surface of distal wall 216 includes two curved track portions 214a and 214b separated by a center rib 214c, wherein track portion 214a extends along one side of the V-shaped proximal surface of the distal wall 216 and track portion 214b extends along the opposite side of the V-shaped proximal surface of distal wall 216. Each track portion 214a and 214b includes two parallel linear portions (218a and 218b, respectively) extending parallel to the channel 212, and two turnarounds (217a and 217b, respectively) so as to form a closed circuit around linear islands (219a and 219b, respectively) to allow circulation of the bearings within the track. The elongated windows 213a and 213b extend along the distal-most linear portion of track portions 214a and 214b, respectively, such that bearings-202 moving along those portions of the tracks at least partially protrude through the respective window to support the shaft 204.

Housing block 210 is of preferably single piece construction and can be fabricated from any suitable material and by any suitable method such as described above with respect to housing block 110 and/or bearing retainer 140.

Bearing race 220 is also preferably of single piece construction and can be fabricated from any suitable material such as, for example, steel, aluminum bronze alloy, engineering plastics such as polyamides, etc. A preferred material for fabricating bearing race 220 is copper infiltrated powder metal steel.

Bearing race 220 includes a body 221 having a V-shaped distal end wall 222 with track portions 224a and 224b separated by a center rib 224c. Track portions 224a and 224b extend along respective sides of the V-shaped distal end wall 222 and are oriented in same manner as track portions 214a and 214b of the housing block. When bearing race 220 is fully inserted into the proximal recess 215 of the housing block, distal end wall 222 is adjacent to distal wall 216 such that the distal surface of wall 222 is flush against the proximal surface of wall 216. Track portions 224a and 224b are thereupon aligned with track portions 214a and 214b to form enclosed tracks in which bearings 202 and movably confined. Bearings 202 are permitted to circulate within the respective tracks.

The tracks each generally define a respective plane which, together, correspond to the V-shaped structure of the distal end of the housing block. As can be seen, the respective planes of the tracks are at an angle from the longitudinal axis Z. That is, neither of the planes of the tracks has any dimension either parallel to or perpendicular to the axis Z. The preferred angle α of the V-shaped structure ranges from about 45° to about 160°, more preferably from about 60° to about 120°, and most preferably from about 80° to about 100°, although angles outside of these ranges may also be used if appropriate.

Bearing race 220 includes a proximally extending post 225 around which optional helical compression spring 230 is mounted. Spring 230 serves as a shock absorber and absorbs overload force, allowing the bearing race 220 to move downward against the biasing force of spring 230 in the event of overload conditions. When overload conditions are terminated the bearing race is biased to its original fully engaged position with respect to housing block 210.

In a severe overload condition, the shaft 204 is brought into contact with distal surface 216 of the housing block and bearing assembly 200 functions as a plain bearing as a result of the V-like geometry of the distal surface of distal wall 216.

Figure 10:
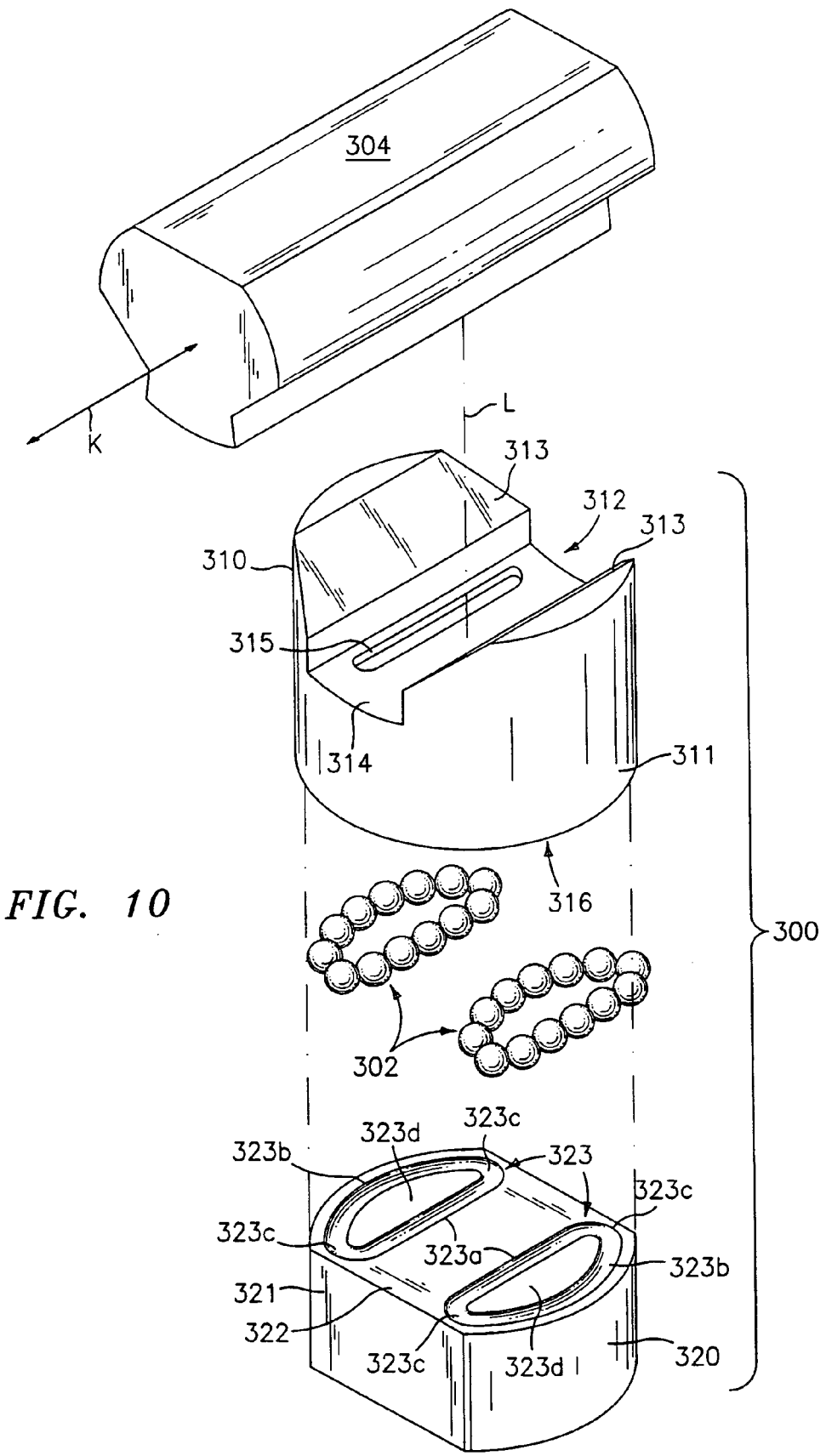
FIG. 10 is an exploded perspective view of another embodiment of the bearing assembly in conjunction with a shaft.
Figure 11:
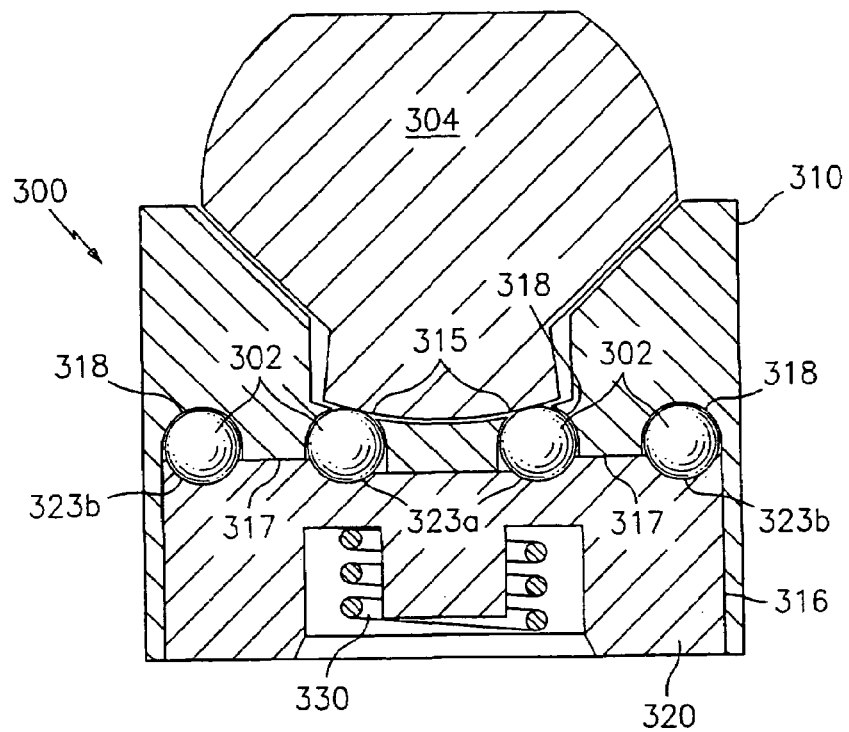
FIG. 11 is a sectional view of the embodiment of FIG. 10.

Referring now to FIGS. 10 and 11, bearing assembly 300 includes a housing block 310, bearing race 320, and a plurality of bearing balls 302.

Housing block 310 also serves as a bearing retainer and includes a generally cylindrical body 311 defining a longitudinal axis L. At its distal end, housing block 310 has a channel 312 with two inclined side surfaces 313 and a bottom surface 314 serving as a shaft support interface. Channel 312 is oriented transverse to the longitudinal axis L and is adapted to receive shaft 304 having an axis K along which shaft 304 is linearly movable. The bottom surface 314 includes two elongated windows 315 oriented parallel to each other and in the direction of axis K. The width of each of the windows 315 is less than the diameter of the bearing balls 302 to permit a portion of the bearings to protrude through the windows to support the shaft 304, which rests on the ball bearings.

The proximal end portion of housing block 310 includes a proximal recess 316 for receiving bearing race 320. Wall 317 at the distal end of proximal recess 316 includes track portions 318.

Bearing race 320 includes a body 321 with a flat distal surface 322 having track portions 323. Each track portion 323 includes a rectilinear portion 323a and a curved portion 323b with connecting turnarounds 323c so as to form closed generally D-shaped loops around islands 323d. Each rectilinear portion 323a is configured and positioned to align with a respective one of the windows 315 such that bearings in the rectilinear portions 323a at least partially protrude through a respective window 315. The track portions 323 align with track portions 318 when the bearing race is fully inserted into the proximal recess 316 so as to form closed tracks in which bearing balls 302 are movably confined. Bearing balls 302 are permitted to circulate within the respective tracks when, for example, shaft 304 is linearly moved along channel 312.

Together, tracks 323 lie in a plane generally defined by distal surface 322 of the bearing race. The plane is perpendicular to the axis L of the housing block.

Bearing assembly 300 can include a helical compression spring 330 to absorb overload forces and shocks (FIG. 11).

In the event of an overload condition the bearing balls 302 are pressed downward by shaft 304 so that they no longer protrude through windows 315. This, in turn, pushes the bearing race 320 downward against the biasing force of spring 330 and compressing the spring. Shaft 304 is thereby brought into contact with the shaft support interface, i.e., side surfaces 313 and/or bottom surface 310 of the channel 312, such that the load bearing capacity of the bearing assembly 300 is augmented to support shaft 304. As noted above, increased frictional resistance may allow the shaft support interface to serve as a braking surface.

Figure 12:
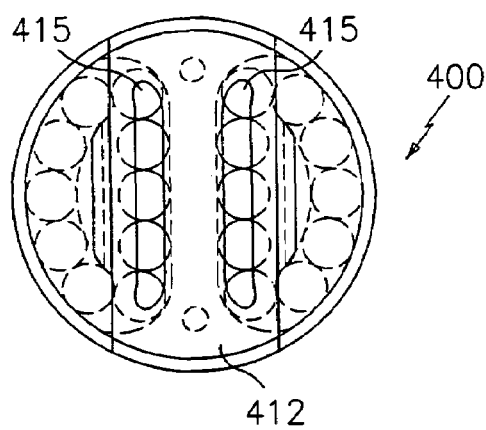
FIG. 12 is a plan view of another embodiment of the bearing assembly.
Figure 13:
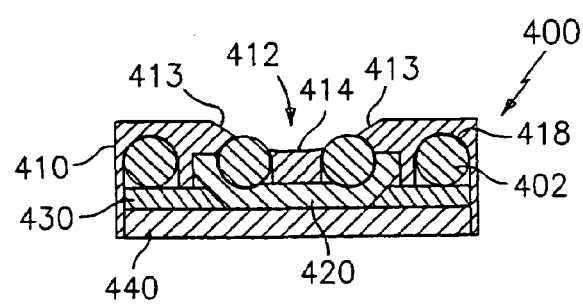
FIG. 13 is a sectional view of the embodiment of FIG. 12.
Figure 14:
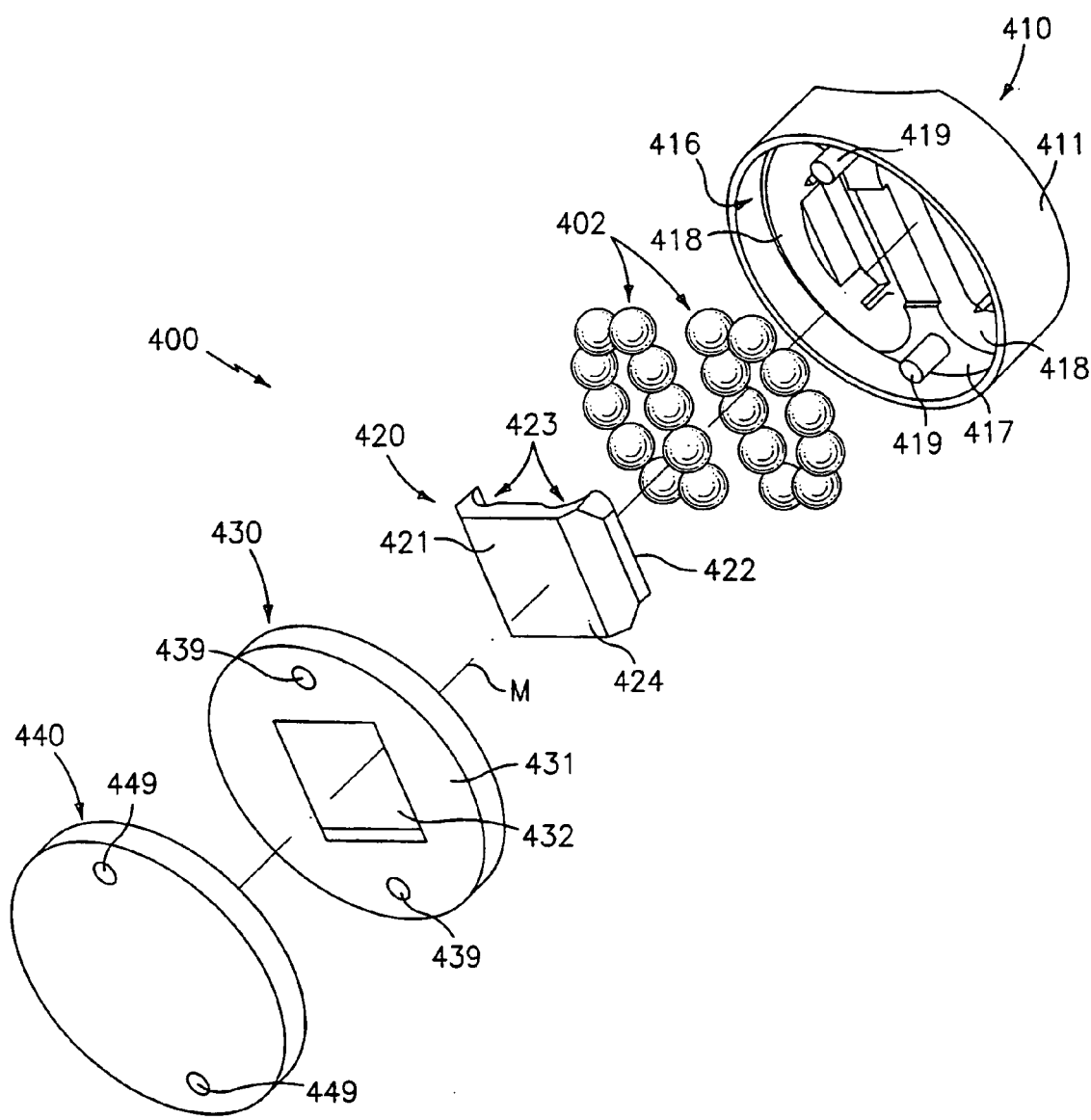
FIG. 14 is an exploded perspective view of the embodiment of FIG. 12.

Referring now to FIGS. 12, 13, and 14 bearing assembly 400 includes a housing block 410, plate 420, lid 430, spacer 440, and bearing balls 402.

Housing block 410 also serves as a bearing retainer and includes a generally cylindrical body 411 defining a longitudinal axis M. At its distal end housing block 410 has a channel 412 with two inclined side surfaces 413 and a bottom surface 414. Channel 412 is oriented transverse to the longitudinal axis M and is adapted to receive a movable shaft (not shown). The channel 412 includes two elongated windows 415 oriented substantially parallel to each other and in the direction of the shaft and channel 412. The width of each of the windows is less than the diameter of the bearing balls 402 to permit a portion of the bearings to protrude through the windows to support the shaft, which rests on the ball bearings.

The proximal end portion of the housing block 410 includes a proximal recess 416 for receiving plate 420, lid 430 and spacer 440. Wall 417 at the distal end of proximal recess 416 includes track portions 418. Track portions 418 are generally D-shaped having a rectilinear portion aligned with channel 412 and a curved portion with turnarounds to form a closed loop configuration. Posts 419 extend proximally from wall 417 to facilitate alignment of the components for assembly.

Plate 420 includes a generally rectangular body 421. The distal surface 422 of plate 420 includes linear track portions 423. The rectangular proximal surface 424 is adapted to be disposed through opening 432 in the lid 430, as discussed below.

Lid 430 includes a disk shaped body 431 having a rectangular opening 432 configured and dimensioned so as to receive the proximal end surface 424 of plate 420. Lid 430 includes apertures 439 adapted to receive posts 419 of the housing block.

Spacer 440 is a disk shaped member having apertures 449 to receive posts 419 of the housing block.

When assembled, ball bearings 402 are disposed along track portions 418. Linear track portions 423 of the plate are aligned with the linear portions of track portions 418 of the housing block. Portions of the bearings 402 at least partially protrude through windows 415 to support the shaft. Lid 430 is disposed proximal to the plate. Spacer 440 is disposed proximal to the lid and is in contact with proximal surface 424 disposed through opening 432.

As can be seen, bearing balls 402 are movably confined in corresponding tracks and are free to circulate around the respective tracks for example when the shaft is moved. The tracks generally lie in a plane which is perpendicular to axis M.

While the above description contains many specifics, these specifics should not be construed as limitations of the scope of the invention, but merely as exemplifications of preferred embodiments thereof. Those skilled in the art will envision many other possible variations that are within the scope and spirit of the invention as defined by the claims appended hereto.

What is claimed is:

1. A bearing assembly shaft support comprising:
   a housing block defining a shaft support interface portion; and
   spaced apart first and second cartridge slots provided in said housing block;
   first and second cartridges each removably inserted into a respective one of said first and second cartridge slots and spaced apart, each cartridge including a plurality of load bearing elements disposed in at least one track having a load bearing portion, a return portion, and turnarounds interconnecting said load bearing portion and return portion, said load bearing elements in said load bearing track portion extending from said shaft support interface portion to support a shaft therein, wherein the guided bearing race is movable against a resilient biasing force of a spring in response to an overload condition to permit contact of the shaft with the shaft support interface portion.

2. The bearing assembly shaft support of claim 1 wherein the bearing assembly includes two guided bearing races.

3. The bearing assembly shaft support of claim 1 wherein each cartridge includes an elongated window through which portions of the load bearing elements extend.

4. The bearing assembly shaft support of claim 1 wherein the spring is disposed within said housing block, said spring resiliently biasing the guided bearing race into contact with the housing block.

5. The bearing assembly shaft support of claim 4 wherein the spring is a helical coil spring.

6. A bearing assembly shaft support of claim 4 wherein the spring is a leaf spring.

7. The bearing assembly shaft support of claim 6 wherein the leaf spring is corrugated.

8. The bearing assembly shaft support of claim 1 wherein the shaft support interface portion includes at last two inclined surfaces.

9. The bearing assembly shaft support of claim 8 wherein the inclined surfaces define an angle of from about 45° to about 160°.

10. The bearing assembly shaft support of claim 8 wherein the inclined surfaces define an angle of from about 60° to about 120°.

11. The bearing assembly shaft support of claim 8 wherein the inclined surfaces define an angle of from about 80° to about 100°.

12. A bearing assembly shaft support comprising:
    (a) a housing block having a longitudinal axis, said housing block having a distal shaft support interface with a laterally oriented channel at least partially defined by a pair of inclined walls, each inclined wall including a slot for receiving a bearing cartridge;
    (b) a pair of bearing cartridges which are each removably inserted into a respective one of said cartridge slots in a spaced-apart relationship, each cartridge comprising a ball track, a plurality of bearings balls disposed in said ball track, and a window for permitting portions of at least same bearing balls to protrude therethrough, said ball track having a load-bearing portion aligned with the window, a return portion and at least two turnaround portions, wherein the ball track is configured for the guided recirculation of the bearing balls, wherein the guided bearing race is movable against a resilient biasing force of a spring element in response to an overload condition to permit contact of the shaft with the shaft support interface.

13. The bearing assembly shaft support of claim 12 wherein the ball tracks each define a respective plane, said planes being parallel to each other and having at least one dimension parallel to the longitudinal axis of the bearing block.

14. The bearing assembly shaft support of claim 12 further comprising a corrugated leaf spring disposed in each of said cartridge slots.

15. A bearing assembly shaft support comprising:
    (a) a housing block having a longitudinal axis, said housing block having a distal shaft interface portion including a laterally oriented channel with first and second parallel elongated windows aligned with the channel and spaced from one another, said housing block having a proximal recess,
    (b) a guided bearing race removably inserted into the proximal recess; and
    (c) first and second ball tracks at least partially formed by said housing blocks and said race, each ball track including a plurality of bearing balls and having a load-bearing portion aligned with a respective one of the first and second windows, a return portion and at least two turnaround portions, wherein each track is configured for the guided recirculation of the bearing balls, wherein each track defines a respective one of first and second planes, said first and second planes being oriented in a V-shaped configuration, and wherein the guided bearing race is movable against a resilient biasing force of a spring element in response to an overload condition to permit contact of the shaft with the shaft support interface.

16. The bearing assembly of claim 15 wherein the spring element is a helical spring positioned proximal to the race.

17. A bearing assembly comprising:
    (a) a housing block having a longitudinal axis and a distal end portion with a laterally oriented channel having first and second parallel windows aligned with the channel, said housing block having a proximal recess;
    (b) a guided bearing race removably inserted into the proximal recess; and
    (c) first and second ball tracks at least partially formed by said housing block and said race, each ball track including a plurality of bearing balls and having a load-bearing portion, aligned with a respective one of the first and second windows, a return portion and at least two turnaround portions, wherein each track is configured for the guided recirculation of the bearing balls, and wherein both tracks are oriented on a single plane, said plane being perpendicular to the longitudinal axis of the housing block, wherein the guided bearing race is movable against a resilient biasing force of a spring element in response to an overload condition to permit contact of the shaft with the shaft support interface.

18. The bearing assembly shaft support of claim 17 wherein the spring element is a helical spring.

19. The bearing assembly shaft support of claim 17 wherein the spring is positioned proximal to the guided bearing race.

* * * * *